(12) United States Patent
Wu et al.

(10) Patent No.: US 11,726,583 B1
(45) Date of Patent: Aug. 15, 2023

(54) MOUSE CONTROL METHOD, MOUSE AND STORAGE MEDIUM

(71) Applicant: Shenzhen Banruozaowu Technology Co., Ltd., Guangdong (CN)

(72) Inventors: Bingqing Wu, Shenzhen (CN); Shangwen Wang, Shenzhen (CN)

(73) Assignee: Shenzhen Banruozaowu Technology Co., Ltd., Guangdong (CN)

( * ) Notice: Subject to any disclaimer, the term of this patent is extended or adjusted under 35 U.S.C. 154(b) by 0 days.

(21) Appl. No.: 17/947,706

(22) Filed: Sep. 19, 2022

(30) Foreign Application Priority Data

Jul. 18, 2022 (CN) .......................... 202210839305.6

(51) Int. Cl.
*G06F 3/0354* (2013.01)
*H04W 4/80* (2018.01)

(52) U.S. Cl.
CPC .......... *G06F 3/03543* (2013.01); *H04W 4/80* (2018.02)

(58) Field of Classification Search
CPC .............................. G06F 3/03543; H04W 4/80
See application file for complete search history.

(56) References Cited

U.S. PATENT DOCUMENTS

| | | | | |
|---|---|---|---|---|
| 11,372,466 | B1* | 6/2022 | Lin | G06F 3/0383 |
| 2005/0104854 | A1* | 5/2005 | Su | G06F 3/038 |
| | | | | 345/163 |
| 2005/0149258 | A1* | 7/2005 | Gargi | G06F 3/04815 |
| | | | | 340/995.14 |
| 2006/0244725 | A1* | 11/2006 | Lou | G06F 3/03543 |
| | | | | 345/163 |
| 2012/0308044 | A1* | 12/2012 | Vander Mey | H04M 3/566 |
| | | | | 381/104 |
| 2017/0351396 | A1* | 12/2017 | Passeri | G06F 3/011 |
| 2020/0272251 | A1* | 8/2020 | Wang | G06F 3/03543 |
| 2022/0015178 | A1* | 1/2022 | Huang | G06F 3/038 |
| 2022/0035593 | A1* | 2/2022 | Lee | G10L 21/0316 |
| 2022/0066725 | A1* | 3/2022 | Xia | G06F 3/0488 |
| 2022/0066731 | A1* | 3/2022 | Schaer | G06F 16/909 |

* cited by examiner

*Primary Examiner* — Ariel A Balaoing
(74) *Attorney, Agent, or Firm* — Cooper Legal Group, LLC

(57) ABSTRACT

The present application relates to a technical field of intelligent control device, particularly to a mouse control method, which includes: receiving a connection signal for establishing a bluetooth connection with a mobile phone in real time; receiving an operation signal associated with the mobile phone, and the operation signal includes a page turning operation signal, a pausing playing operation signal, a starting playing operation signal; sending a corresponding operation instructions to the mobile phone based on the operation signal. The present application is convenient for the user to use the mobile phone and the computer together.

13 Claims, 3 Drawing Sheets

MOUSE CONTROL METHOD, MOUSE AND STORAGE MEDIUM

CROSS-REFERENCE TO RELATED APPLICATION

The present application claims the priority to Chinese patent application No. 202210839305.6, filed on Jul. 18, 2022. The entirety of Chinese patent application No. 202210839305.6 is hereby incorporated by reference herein and made a part of this specification.

TECHNICAL FIELD

The present application relates to a technical field of intelligent control device, and in particularly, relates to a mouse control method, a mouse and a storage medium.

BACKGROUND

A mouse is an external input device of a computer. A mouse usually includes a shell, a left button, a right button, a wheel button and a laser. In using, a user controls a computer by moving a finger to click the left button, the right button or the wheel button or by moving the mouse, such as opening a document, a window and a video, etc., to achieve corresponding functions. The mouse is widely used in a field of office.

However, at work, the computer may often be used together with a mobile phone. In this situation, the user usually operates the computer by using a mouse by one hand, and operates the mobile phone by another hand. However, this method is not convenient, thus it still needs to be improved.

Information disclosed in the background art aims to facilitate an understanding of the general background of the present invention, and should not be considered to acknowledge or imply in any forms that the information is the prior art known to those skilled in the art.

SUMMARY

The present application aims to provide a mouse control method, a mouse and a storage medium, so as to facilitate the user to operate a mobile phone and a computer together.

A first object of the present application is achieved by a following technical solutions.

A mouse control method includes:
receiving a connection signal for establishing a bluetooth connection with the mobile phone in real time;
receiving an operation signal associated with the mobile phone, and the operation signal includes a page turning operation signal, a pausing playing operation signal, and a starting playing operation signal; and
sending a corresponding operation instruction to the mobile phone based on the operation signal.

In the above technical solution, after receiving the connection signal, it indicates that the mouse is in a communication with the mobile phone. In this case, only when the operation signal associated with the mobile phone is received, the corresponding operation instruction can be sent to the mobile phone. Therefore, it is convenient for a user to operate the mobile phone by the mouse, and an applicability of the mouse is improved.

In some embodiments, the receiving an operation signal associated with the mobile phone includes:
receiving a plurality of continuous trigger signals in real time;
determining a plurality of trigger times associated with the plurality of trigger signals, and one of the plurality of trigger signals corresponds to a time point at which one of the plurality of trigger signals starts;
calculating a number of the trigger times within the preset time period;
determining the operation signal associated with the mobile phone based on the number of the trigger times within the preset time period.

In the above technical solution, receiving the continuous trigger signals first, and judging whether the trigger signal is generated by mistake or by normal triggering by the number of the trigger times, which are associated with the trigger signals. This setting is conducive to improving an accuracy of the user controlling the mobile phone by the mouse.

In some embodiments, the determining the number of the trigger times within the preset time period also includes:
when the number of the trigger times within the preset time period is equal to 1, calculating a duration time of the trigger signal;
when the duration time is greater than a preset duration time threshold, disconnecting a power supply.

In the above technical solution, when the user forgets to disconnect the bluetooth connection between the mobile phone and the mouse, the continuous trigger signals are received. When the number of the trigger times is 1, and the duration time is greater than the preset duration time threshold, disconnecting the power supply. In this way, it can prevent the mouse from being touched by mistake caused by being squeezed by other objects when the mouse is placed in a narrow space.

In some embodiments, the receiving the operation signal associated with the mobile phone includes:
when the operation signal is the starting playing operation signal, obtaining a historical playback volume setting record associated with the mobile phone in real time;
determining a current playback volume setting of the mobile phone, based on the historical playback volume setting record, in which the playback volume is in decibels;
determining current environmental volume in real time, and comparing the current environmental volume with the current playback volume of the mobile phone;
when the current environmental volume is lower than the current playback volume of the mobile phone, sending a mute playing signal to the mobile phone.

In the above technical solution, this setting is conducive to avoiding affecting an experience of the user when playing with a large volume in a quiet environment.

A second object of the present application is achieved by the following technical solutions.

A mouse includes a shell body and a control device;
the shell body includes an upper shell, a side shell and a base;
the control device includes a power module and a phone bluetooth remote control module configured for bluetooth communication with the mobile phone, and the power module is connected with the phone bluetooth remote control module;
the power module and the phone bluetooth remote control module are mounted on the base, and the side shell is mounted on a side of the base, and the upper shell is mounted on the top of the side shell; page turning buttons are provided at a position of the side shell close to the upper shell, and the page turning buttons are connected with the phone bluetooth remote control module; the upper shell are provided with a left button area and a right button area for contacting with fingers, and the upper shell is provided with a mobile phone control button in middle; the mobile phone control button is connected with the phone bluetooth remote control module, and the mobile phone control button is located between the left button area and the right button area.

In the above technical solution, the phone bluetooth remote control module is connected with the page turning button and the mobile phone control button, when pressing the mobile phone control button or the page turning button, a page turning on the mobile phone can be controlled. Thus, when the user needs to use the computer and the mobile phone together, the mobile phone can be controlled by the mouse, which is conducive to improving a convenience when using the computer and the mobile phone together. In addition, the page turning button is provided at the side shell, so as to facilitate fingers of the user to press the page turning button; and the mobile phone control button is provided between the left button area and the right button area, which is also facilitate the fingers of the user to press the mobile phone control button.

In some embodiments, the control device also includes a main control module and a switching unit, the main control module is connected with the power module, and the main control module is configured for communication with the computer; the base is provided with a mode switch button that is connected with the switching unit; the switching unit is configured for switching a computer control mode and a mobile phone control mode.

In the above technical solution, the mode switch button is provided, so that the user can flexibly select the connection between the mouse and the computer or the mobile phone.

In some embodiments, the side shell includes a thumb pressing area and a little finger pressing area, and the page turning button is located at the position of the thumb pressing area close to the upper shell.

In the above technical solution, this setting is helpful for the user to quickly find the page turning button to quickly press the page turning button.

In some embodiments, a side surface of the thumb pressing area 105 is provided as a concave arc surface.

In the above technical solution, a providing of the concave arc surface is facilitate holding the mouse and improves the comfort of the user when holding the mouse.

A third object of the present application is achieved by the following technical solutions.

A non-transitory computer-readable storage medium with computer program stored thereon, in which, the computer program is configured to implement the mouse control method as described in any one of the above technical solutions when being loaded and executed by a processor.

In summary, the present application has at least one of the following beneficial technical effects.

1. The phone bluetooth remote control module is connected with the page turning button and the mobile phone control button, when pressing the mobile phone control button or the page turning button, a page turning on the mobile phone can be controlled. Thus, when the user needs to use the computer and the mobile phone together, the mobile phone can be controlled by the mouse, which is conducive to improving a convenience when using the computer and the mobile phone together. In addition, the page turning button is provided at the side shell, so as to facilitate fingers of the user to press the page turning button; and the mobile phone control button is provided between the left button area and the right button area, which is also facilitate the fingers of the user to press the mobile phone control button.

2. After receiving the connection signal, it indicates that the mouse is in a communication with the mobile phone. In this case, only when the operation signal associated with the mobile phone is received, the corresponding operation instruction can be sent to the mobile phone. Therefore, it is convenient for a user to operate the mobile phone by the mouse, and an applicability of the mouse is improved.

DETAILED DESCRIPTION

The present application will be further described in details with reference to FIGS. 1-5 and embodiments.

Figure 1:
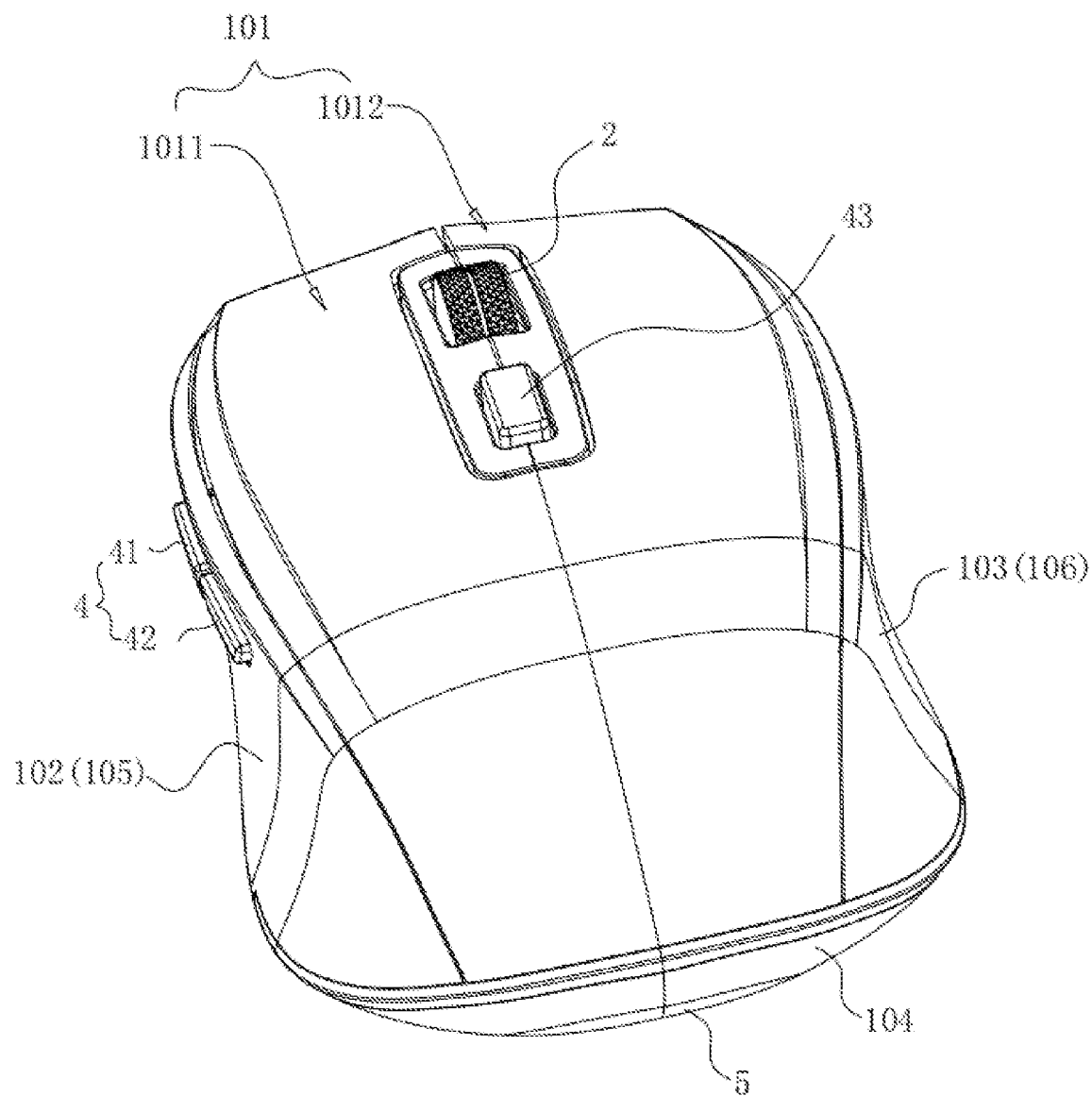
FIG. 1 is a structural diagram showing a mouse according the present application.

An embodiment of the present application provides a mouse, which may be applied to a scenario where a user needs to operate a mobile phone and a computer meanwhile. Referring to FIG. 1, the mouse includes a shell body, a control device 3 and a wheel button 2. The shell body includes an upper shell 101, a side shell and a base 104. The side shell includes a left shell 102 and a right shell 103, and a bottom of the left shell 102 and the bottom of the right shell 103 are respectively mounted on both sides of the base 104, and the left shell 102, the right shell 103 and the base 104 enclose a space for mounting the control device 3. The upper shell 101 is mounted on the top of the side shell for the user to hold the mouse. The control device 3 is configured for communication with the computer or the mobile phone. The wheel button 2 is rotatably arranged at the front of the upper shell 101, and is connected with the control device 3, so as to realize a paging up and down operation of the computer by rolling the wheel button.

Figure 2:
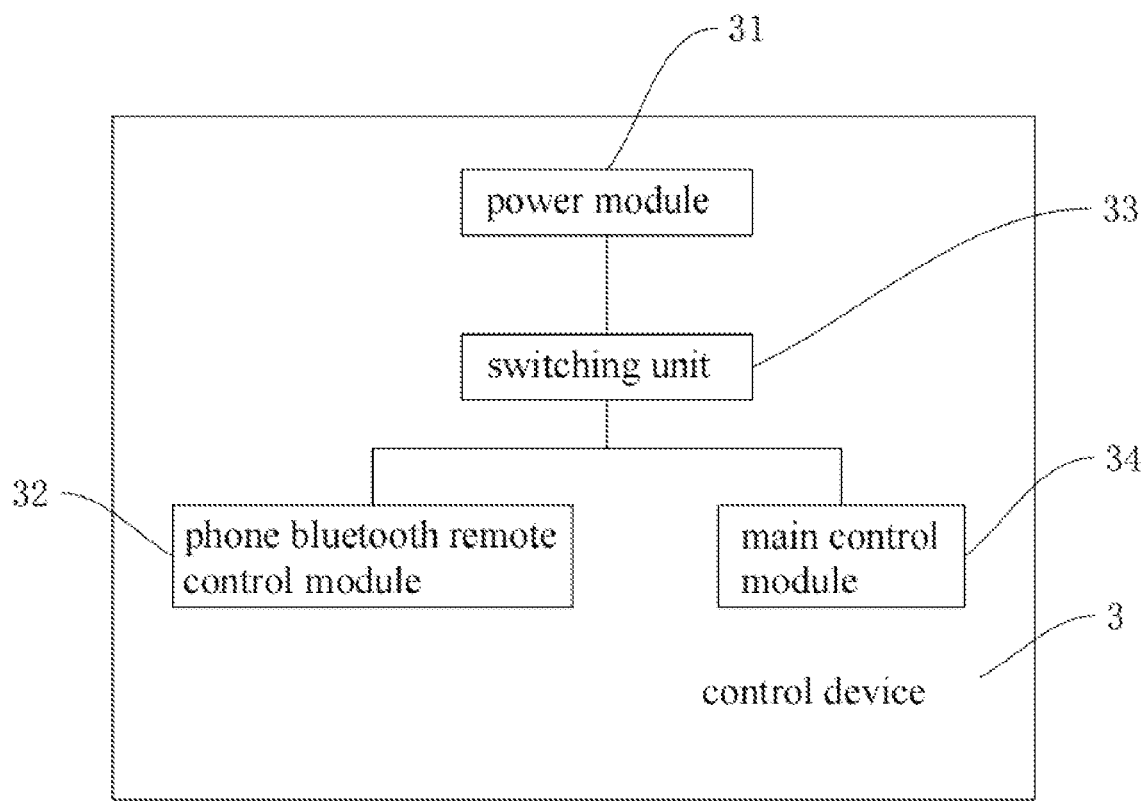
FIG. 2 is a structural block diagram showing a control device of the mouse according the present application.

Referring to FIGS. 1 and 2, the control device 3 includes a power module 31, a main control module 34, a phone bluetooth remote control module 32 and a switching unit 33. The power module 31 is configured to supply power for the main control module 34 or the phone bluetooth remote control module 32. The main control module 34 is configured for communication with the computer, and the phone bluetooth remote control module 32 is configured for communication with the mobile phone. Specifically, the phone bluetooth remote control module 32 is configured for receiving a connection signal for establishing a bluetooth connection with the mobile phone in real time. The power module 31 is connected with the phone bluetooth remote control module 32; the main control module 34 is connected with the power module 31, and is configured for communication with the computer. The main control module 34 and the phone bluetooth remote control module 32 are connected with the power module 31 by the switching unit 33. The shell body of the mouse is provided with a mode switch button 5 that is connected with the switching unit 33; the switching unit 33 is configured for switching a computer control mode and a mobile phone control mode. When the phone bluetooth remote control module 32 is connected with the power module 31 via the switching unit 33, the mouse is in the mobile phone control mode, and the user can operate the mobile phone by the mouse; when the main control module 34 is connected with the power module 31 via the switching unit 33, the mouse is in the computer control mode, and the user can operate the computer by the mouse. Additionally, a front side of the base 104 is provided with an USB interface, and the mouse can be connected with the computer by the USB interface and an USB data cable, so that the user can use the mouse while charging, which is beneficial to make the mouse meet diversified use scenes.

Referring to FIG. 1, the side shell includes a thumb pressing area 105 and a little finger pressing area 106. A side surface of the thumb pressing area 105 is provided as a concave arc surface, so as to match a hand posture of the user when holding the mouse. The thumb pressing area 105 is provided at the position where the side shell contacts with the thumb of the right hand when the user holds the mouse with a right hand; the little finger pressing area 106 is provided at the position where the side shell contacts with a little finger or a tail finger of the right hand. The mode switch button 5 is provided at the thumb pressing area 105 of the side shell, so that the user can quickly switch a working mode of the mouse, so as to be suitable for the use scene of cooperating use of the mobile phone and the computer. In an embodiment, the mode switch button 5 also can be provided at the base 104.

The upper shell 101 with provided with a left button area 1011 and a right button area 1012 for contacting with fingers, which are respectively provided at both sides of the wheel button 2. The main control module 34, the left button area 1011, the right button area 1012 and the wheel button 2 cooperate with each other to realize a function of controlling the computer by the user.

In order to facilitate the user to further control the mobile phone, page turning buttons 4 are provided at the position of the side shell close to the upper shell 101, and is located at the position of the thumb pressing area 105 close to the upper shell 101, and at one side of the mode switch button 5. In an embodiment, the page turning button 4 also can be provided at the little finger pressing area 106. The upper shell 101 is provided with a mobile phone control button 43 in middle, which is located at a back side of the wheel button 2 and between the left button area 1011 and the right button area 1012. The mobile phone control button 43 is connected with the phone bluetooth remote control module 32. The phone bluetooth remote control module 32, the mobile phone control button 43 and the page turning button 4 cooperate with each other to achieve a function of controlling the mobile phone by the user. Specifically, the page turning button 4 and the mobile phone control button 43 are operated to obtain an operation signal associated with the mobile phone.

Specifically, the page turning button 4 includes a paging up button 41 and a paging down button 42, which are respectively connected with the phone bluetooth remote control module 32. When the mouse is in a bluetooth connection with the mobile phone by the phone bluetooth remote control module 32, the user can turn the page on the mobile phone up or down by the paging up button 41 or the paging down button 42. In another case, when the mobile phone displays multiple videos, single video can be selected by clicking the paging up button 41 or the paging down button 42.

Figure 3:
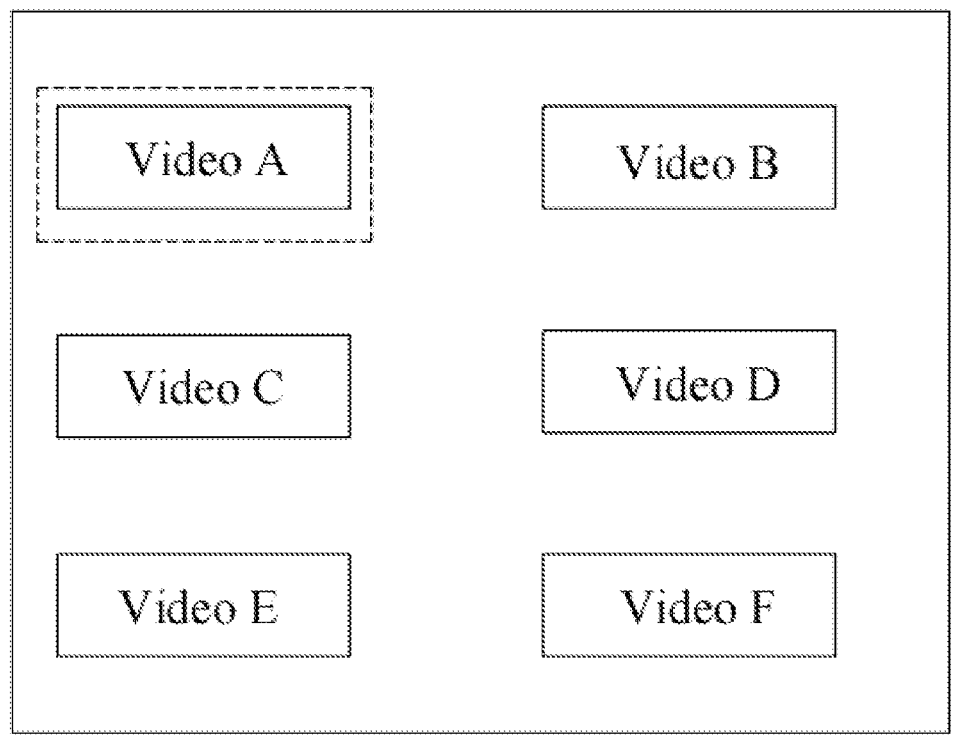
FIG. 3 is a schematic diagram showing using of a page turning button according to one embodiment of the present application.
Figure 4:
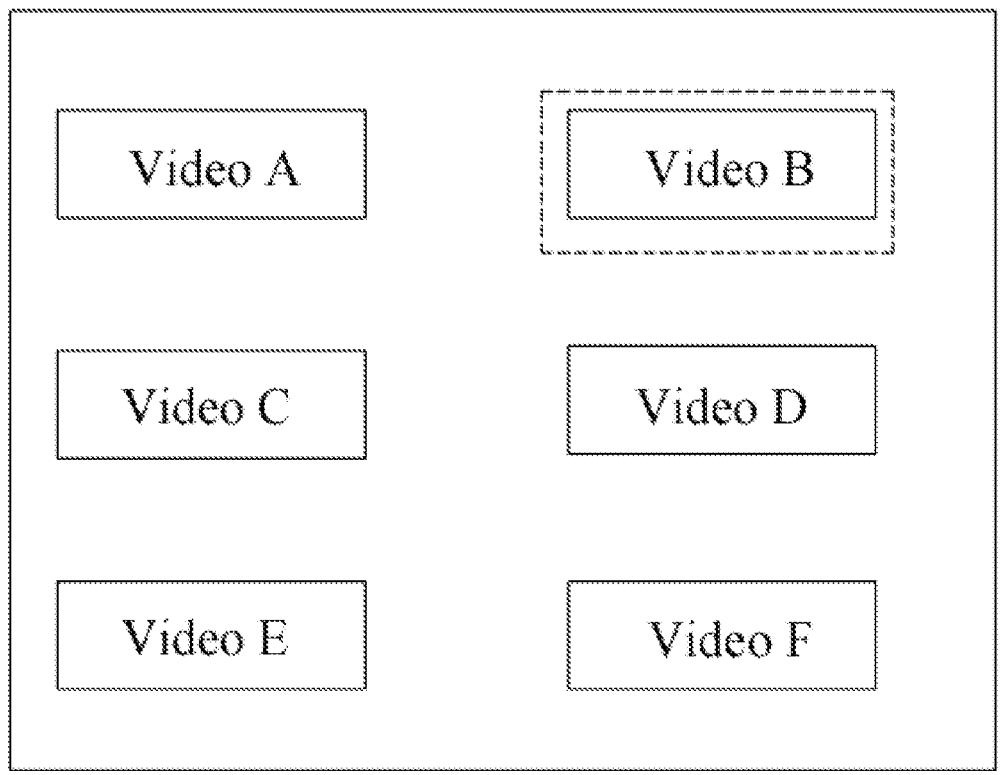
FIG. 4 is a schematic diagram showing using of a page turning button according to one embodiment of the present application.

FIG. 3 shows that video A is currently selected, and after the user clicks the paging down button 42, as shown in FIG. 4, video B is selected instead of video A. And then, after the user clicks the paging up button 41, video A can be selected instead of video B.

More specifically, when the user presses the paging up button 41 for a long time, a playback volume of the mobile phone can be increased. When the user presses the paging down button 42 for a long time, the playback volume of the mobile phone can be decreased. Additionally, when the user clicks the mobile phone control button 43, a playing of the video on the mobile phone is paused. If the user presses the mobile phone control button 43 for a long time, for example, pressing the mobile phone control button 43 for 2s-3s, a current application process of the mobile phone will be terminated and a desktop is returned.

The implementation principle of the present application will be described below.

The communication between the mouse and the mobile phone can be realized by the phone bluetooth remote control module 32; at the same time, by cooperating with the page turning button 4 and the mobile phone control button 43, the mobile phone mode and the computer mode can be quickly switch when the user holding the mouse, so that the user can use the mobile phone and the computer together in an office process.

The embodiment of the present application also provides a mouse control method, which is based on the mouse in the above embodiment, and is applied to the scene where the user needs to use the mobile phone and the computer together, so that the user can switch the mobile phone mode or the computer mode by the mouse, thus an applicability of the mouse is improved, and a convenience of operating the mobile phone and the computer together.

Figure 5:
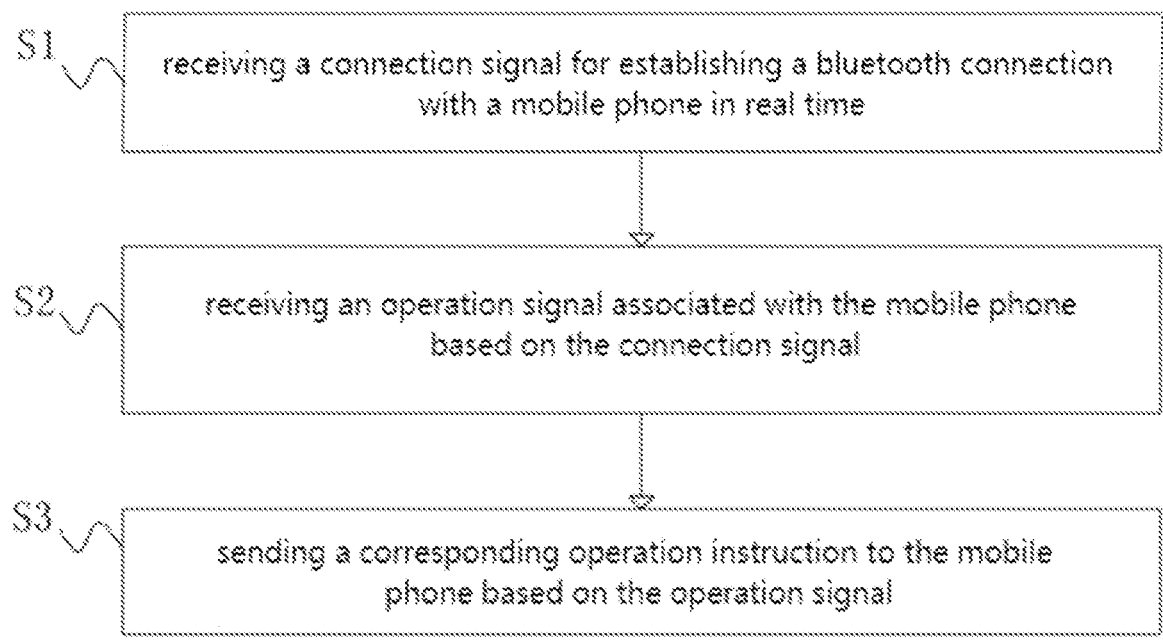
FIG. 5 is a flowchart showing a mouse control method according to one embodiment of the present application.

Referring to FIG. 5, the mouse control method includes:

step S1: receiving a connection signal for establishing a bluetooth connection with the mobile phone in real time.

Specifically, first, establishing a communication between the mouse and the mobile phone by the phone bluetooth remote control module 32, and receiving the connection signal in real time, which is help the mouse to real-time and rapid response to the connection signal.

Step S2: receiving the operation signal associated with the mobile phone, and the operation signal includes but not limit to a page turning operation signal, a pausing playing operation signal, a starting playing operation signal, a volume increasing operation signal, a volume decreasing operation signal and a returning back to desktop operation signal, etc.

Judging whether the mouse is connected with the mobile phone based on the connection signal, and receiving the operation signal associated with the mobile phone after connection. When the user clicks the page turning button 4, the page turning operation signal is received. Specifically, for example:

presetting a click duration range of the page turning button 4; the preset click duration range associated with the page turning operation is 0.1s-1s; the preset click duration range associated with the volume adjusting is 2s-3s;

presetting the click duration range of the mobile phone control button 43; the preset click duration ranges associated with the starting playing operation and the pausing playing operation are 0.3s-1s; the preset click duration range associated with the returning back to desktop operation is 2s-3s.

More specifically, step S2 is further explained with reference to the following scene.

When the user clicks the paging up button 41 and a click duration time is 0.5s, the page turning operation signal is received.

When the user presses the paging up button 41 for a long time and a press duration time is 2s, the volume increasing operation signal is received.

When the user presses the paging down button 42 for a long time and the press duration time is 2s, the volume increasing operation signal is received.

When the user clicks the mobile phone control button 43 and the click duration time is 1s, the pausing playing operation signal is received.

When the user presses the mobile phone control button 43 for a long time and the press duration time is 2s, the returning back to desktop operation signal is received.

Step S3: sending a corresponding operation instruction to the mobile phone based on the operation signal.

In some embodiments, step S2 also includes:

(1) when the operation signal is the starting playing operation signal, obtaining a historical playback volume setting record associated with the mobile phone in real time;

(2) determining a current playback volume of the mobile phone based on the historical playback volume setting record, in which the playback volume is in decibels;

(3) determining current environmental volume in real time, and comparing the current environmental volume with the current playback volume of the mobile phone; and (4) when the current environmental volume is lower than the current playback volume of the mobile phone, sending a mute playing signal to the mobile phone.

When the operation signal is the starting playing operation signal, the playback volume of the mobile phone is not adjusted, thus the current playback volume of the mobile phone needs to be determined based on the historical playback volume, and the current playback volume of the mobile phone is analyzed to obtain the playback volume (in decibels), and then the playback volume is compared with the current environmental volume, so as to avoid the situation of suddenly loudly playing when clicking the video to watch caused by the user forgetting to set the playback volume of the mobile phone before playing the video.

In some embodiments, step S2 also includes:

step S21: receiving a plurality of continuous trigger signals in real time; the trigger signal refers to the signal generated when clicking the page turning button 4 or the mobile phone control button 43;

step S22: determining a plurality of trigger times associated with the plurality of trigger signals, and one of the plurality of trigger times corresponds to a time point at which one of the plurality of trigger signal starts;

step S23: calculating a number of the trigger times within the preset time period;

step S24: determining the operation signal associated with the mobile phone based on the number of the trigger times within the preset time period.

In which, step S23 also includes:

S231: when the number of the trigger times is 1 within the preset time period, calculating a duration time of the trigger signal.

Specifically, starting timing from the time point at which the page turning button 4 or the mobile phone control button 43 is triggered, if the duration time exceeds 15s, and the number of the trigger times is 1, it is determined that the page turning button 4 or the mobile phone control button 43 is continuously pressed.

For example, it is assumed that the preset time period is 16s. If the page turning button 4 is pressed from 10:00:00, starting timing from 10:00:00. At 10:00:16, first, calculating the number of the trigger times within a time period from 10:00:00 and 10:00:16, so as to judge whether a pressing of the page turning button 4 is continuous or intermittent. If the number of the trigger times is more than one, it indicates that the page turning button 4 is intermittently pressed during this time period; if the number of the trigger times is 1, it indicates that the page turning button 4 is continuously pressed during this time period. When it is determined that the number of the trigger times is 1, the duration time of continuously pressing the page turning button 4 is recorded.

S232: when the duration time is greater than a preset duration time threshold, disconnecting a power supply.

For example, it is assumed that the preset duration time is 15s. If the duration time determined in step S231 is 16s, since the duration time is greater than the preset duration time threshold, it is determined that the page turning button 4 or the mobile phone control button 43 is triggered by mistake. Thus, the connection between the phone bluetooth remote control module 32 and the power module 31 needs to be disconnected.

Specifically, since there are some cases where the page turning button 4 or the mobile phone control button 43 need to be click, double-click or press for a long time, thus, receiving the continuous trigger signals first, and judging whether the trigger signal is generated by mistake or by normal triggering by the number of the trigger times, which are associated with the trigger signals. If the trigger signal is generated by normal triggering, it can be judged that the page turning button 4 or the mobile phone control button 43 is single-clicked (the number of the trigger times is 1 and the duration time of the trigger signal is in the range of 0.1s-1s), double-clicked (the number of the trigger times is more than 1) or pressed for a long time (the number of the trigger times is 1 and the duration time of the trigger signal is in the range of 15-155) by a cooperation of the number of the trigger times and the duration time. This setting is conducive to improving an accuracy of the user controlling the mobile phone by the mouse. Specifically, in step S23, starting timing from the time point at which the first trigger signal starts, so as to judge whether or not the preset time period is reached.

It should be understood that, a number of each step in the above embodiment does not mean an execution order, the execution order of each process should be determined by its function and internal logic, and should not limit an implementation process of the embodiment in the present application.

A specific limitation of the control device 3 of the mouse can refer to the limitation of the mouse control method describe above, which will not be repeated here. Each module in the control device 3 of the mouse described above can be realized by a software, a hardware and combinations thereof in whole or in part. Each module described above can be embedded in or independent of the control device 3 of the mouse in a form of hardware, or can be stored in control device 3 in the mouse in the form of software, so that a processor can call and execute the operations corresponding to the above modules.

The embodiment of the present application also discloses a computer-readable storage medium with computer program stored on, and the computer program is configured to implement the following steps when being executed by the processor:

step S1: receiving the connection signal for establishing a bluetooth connection with the mobile phone in real time;

step S2: based on the connection signal, receiving the operation signal associated with the mobile phone;

step S3: sending the corresponding operation instruction to the mobile phone based on the operation signal.

When the processor executes the computer program, the processor can also execute the steps of the mouse control method in any above embodiments.

Those skilled in the art can understand that, all or part of the processes in the method of the above embodiments can be implemented by instructing relevant hardware by the computer program, and the computer program can be stored on the non-transitory computer-readable storage medium. When the computer program is executed, the process such as the methods described in the embodiments above may be included. In which, any references to a memory, a storage, a database or other media used in each embodiment provided in the present application can include a nonvolatile and/or a volatile memory. The nonvolatile memory can include a read-only memory (ROM), a programmable ROM (PROM), an electrically programmable ROM (EPROM), an electrically erasable programmable ROM (EEPROM) or a flash memory. The volatile memory can include a random access memory (RAM) or an external cache. As an illustration and not a limitation, RAM includes may forms, such as a static RAM, a dynamic RAM, a synchronous DRAM (SDRAM), a double data rate SDRAM (DDRSDRAM), an enhanced SDRAM (ESDRAM), a synchlink DRAM (SL-DRAM)m a rambus RAM (RDRAM), a direct rambus RAM (DRDRAM) and a rambus dynamic RAM (RDRAM) etc.

Those skilled in the art can clearly understand that, for convenience and brevity of description, a division of above functional units and modules is only to be taken as example. In practical application, the above functions can be completed by different functional units and modules according to requirements. That is to say, an internal structure of the device is divided into different function units or modules to complete all or part of the functions described above.

The above embodiments are only used to describe the technical solution of the present application and are not used to limit the present application. Although the present application is described in detail based on the foregoing embodiments, those skilled in the art should understand that: the technical solutions described in the foregoing embodiments can still be modified, or some of technical features can be equivalently replaced. However, these modifications or replacements do not make an essence of the corresponding technical solutions to deviate from a spirit and a scope of the technical solutions in the embodiments of the application, and should be considered as falling within the protection scope of the present application.

What is claimed is:

1. A mouse control method, comprising:
   receiving a connection signal for establishing a bluetooth connection with a mobile phone in real time;
   receiving an operation signal associated with the mobile phone, wherein the operation signal comprises a page turning operation signal, a pausing playing operation signal, and a starting playing operation signal; and
   sending a corresponding operation instruction to the mobile phone based on the operation signal;
   wherein the receiving an operation signal associated with the mobile phone comprises:
      receiving a plurality of continuous trigger signals in real time;
      determining a plurality of trigger times associated with the plurality of continuous trigger signals, wherein one of the plurality of trigger times corresponds to a time point at which one of the plurality of continuous trigger signal starts;
      calculating number of trigger times within a preset time period; and
      determining the operation signal associated with the mobile phone based on the number of the trigger times within the preset time period.

2. The mouse control method according to claim 1, wherein, after the calculating number of trigger times within a preset time period, the method further comprises:
   when the number of the trigger times within the preset time period is equal to 1, calculating a duration time of the trigger signal; and
   when the duration time is greater than a preset duration time threshold, disconnecting a power supply.

3. The mouse control method according to claim 1, wherein the receiving an operation signal associated with the mobile phone further comprises:
   when the operation signal is the starting playing operation signal, obtaining a historical playback volume setting record associated with the mobile phone in real time;
   determining a current playback volume of the mobile phone based on the historical playback volume setting record, wherein the current playback volume is in decibels;
   determining current environmental volume in real time, and comparing the current environmental volume with the current playback volume of the mobile phone; and
   when the current environmental volume is lower than the current playback volume of the mobile phone, sending a mute playing signal to the mobile phone.

4. A mouse for implementing the mouse control method according to claim 1, comprising: a shell body and a control device; wherein,
   the shell body comprises an upper shell, a side shell and a base;
   the control device comprises a power module and a phone bluetooth remote control module configured for establishing a bluetooth communication with the mobile phone, and the power module is connected with the phone bluetooth remote control module;
   the power module and the phone bluetooth remote control module are mounted on the base, the side shell is mounted on a side of the base, and the upper shell is mounted on top of the side shell; page turning buttons are provided at a position of the side shell close to the upper shell, and the page turning buttons are connected with the phone bluetooth remote control module; the upper shell is provided with a left button area and a right button area for contacting with fingers, and the upper shell is provided with a mobile phone control button in middle; the mobile phone control button is connected with the phone bluetooth remote control module, and the mobile phone control button is located between the left button area and the right button area.

5. The mouse according to claim 4, wherein the control device further comprises a main control module and a switching unit, the main control module is connected with the power module, and the main control module is configured for communication with a computer; the base is provided with a mode switch button that is connected with the switching unit; the switching unit is configured for switching a computer control mode and a mobile phone control mode.

6. The mouse according to claim 4, wherein the side shell comprises a thumb pressing area and a finger pressing area, and at least one of the page turning buttons is located at a position of the thumb pressing area close to the upper shell.

7. The mouse according to claim 6, wherein a side surface of the thumb pressing area is a concave arc surface.

8. A non-transitory computer-readable storage medium with a computer program stored thereon, wherein the computer program is configured to implement the mouse control method according to claim 1 when being loaded and executed by a processor.

9. A mouse control method, comprising:
receiving a connection signal for establishing a bluetooth connection with a mobile phone in real time;
receiving an operation signal associated with the mobile phone, wherein the operation signal comprises a page turning operation signal, a pausing playing operation signal, and a starting playing operation signal; and
sending a corresponding operation instruction to the mobile phone based on the operation signal;
wherein the receiving an operation signal associated with the mobile phone comprises:
when the operation signal is the starting playing operation signal, obtaining a historical playback volume setting record associated with the mobile phone in real time;
determining a current playback volume of the mobile phone based on the historical playback volume setting record, wherein the current playback volume is in decibels;
determining current environmental volume in real time, and comparing the current environmental volume with the current playback volume of the mobile phone; and
when the current environmental volume is lower than the current playback volume of the mobile phone, sending a mute playing signal to the mobile phone.

10. A mouse for implementing the mouse control method, comprising receiving a connection signal for establishing a bluetooth connection with a mobile phone in real time; receiving an operation signal associated with the mobile phone, wherein the operation signal comprises a page turning operation signal, a pausing playing operation signal, and a starting playing operation signal; and sending a corresponding operation instruction to the mobile phone based on the operation signal, the mouse comprising a shell body and a control device; wherein,
the shell body comprises an upper shell, a side shell and a base;
the control device comprises a power module and a phone bluetooth remote control module configured for establishing a bluetooth communication with the mobile phone, and the power module is connected with the phone bluetooth remote control module;
the power module and the phone bluetooth remote control module are mounted on the base, the side shell is mounted on a side of the base, and the upper shell is mounted on top of the side shell; page turning buttons are provided at a position of the side shell close to the upper shell, and the page turning buttons are connected with the phone bluetooth remote control module; the upper shell is provided with a left button area and a right button area for contacting with fingers, and the upper shell is provided with a mobile phone control button in middle; the mobile phone control button is connected with the phone bluetooth remote control module, and the mobile phone control button is located between the left button area and the right button area.

11. The mouse according to claim 10, wherein the control device further comprises a main control module and a switching unit, the main control module is connected with the power module, and the main control module is configured for communication with a computer; the base is provided with a mode switch button that is connected with the switching unit; the switching unit is configured for switching a computer control mode and a mobile phone control mode.

12. The mouse according to claim 10, wherein the side shell comprises a thumb pressing area and a finger pressing area, and at least one of the page turning buttons is located at a position of the thumb pressing area close to the upper shell.

13. The mouse according to claim 12, wherein a side surface of the thumb pressing area is a concave arc surface.

* * * * *